United States Patent Office 3,452,662
Patented July 1, 1969

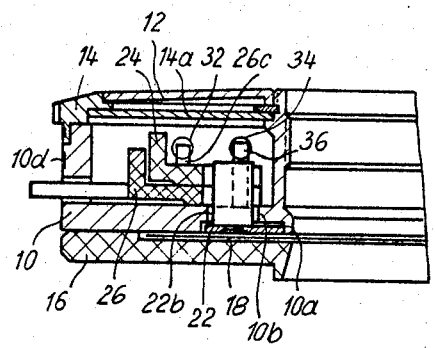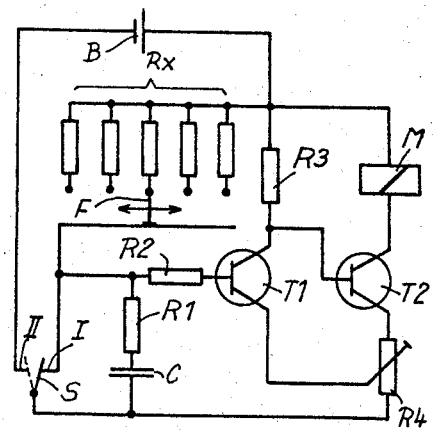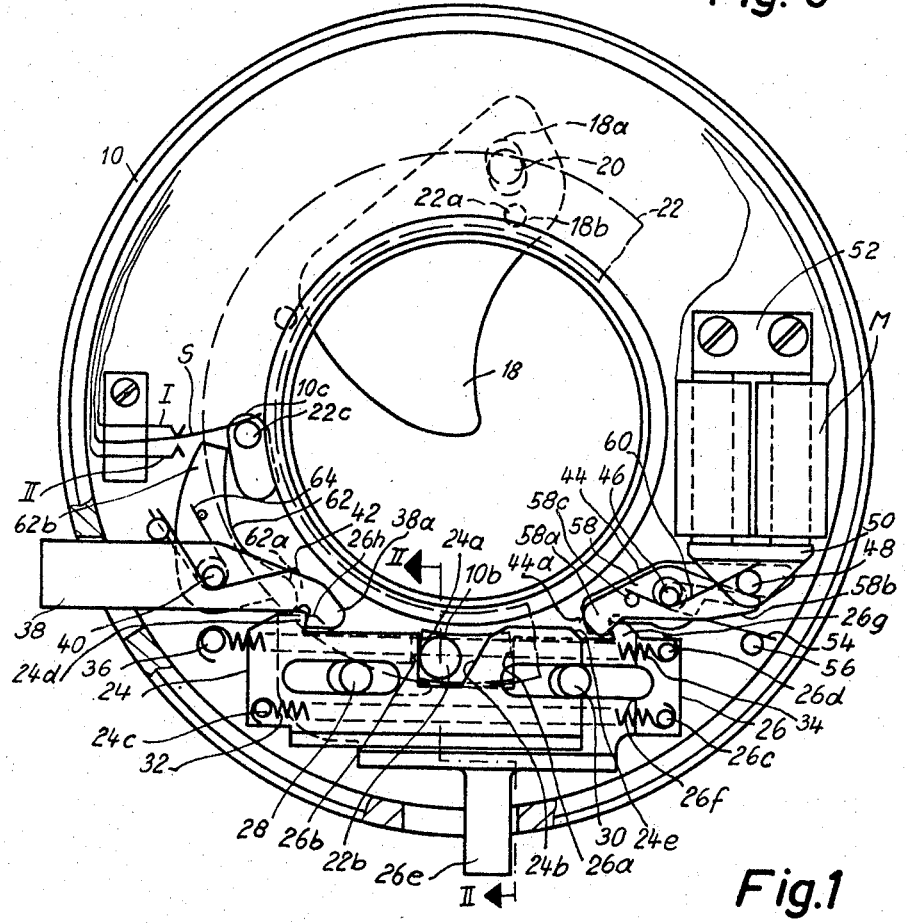

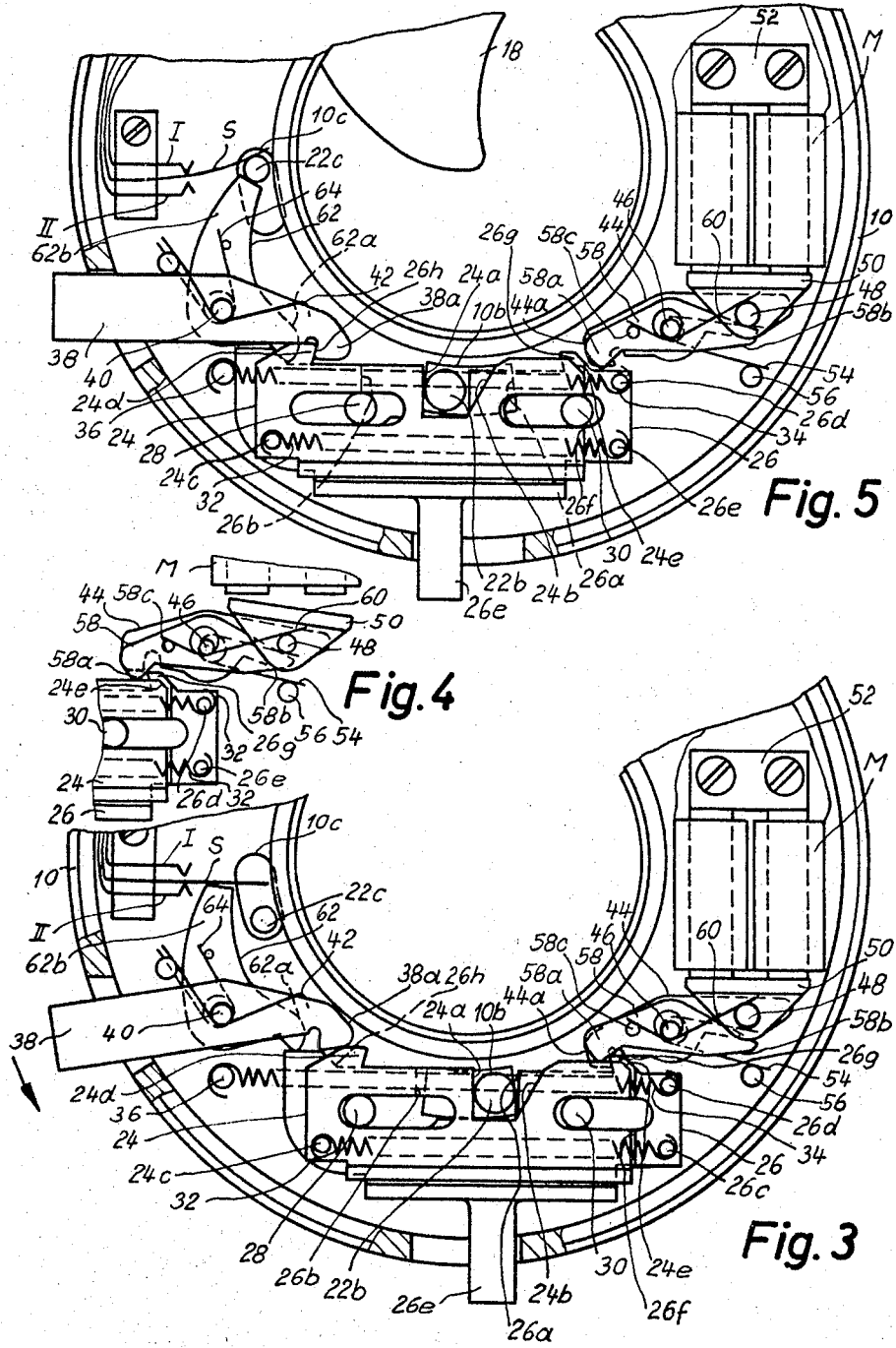

3,452,662
PHOTOGRAPHIC SHUTTER
Franz Singer, Munich, Germany, assignor to Compur-Werk Gesellschaft mit beschrankter Haftung & Co., Munich, Germany, a firm of Germany
Filed Jan. 6, 1967, Ser. No. 607,695
Claims priority, application Germany, Jan. 10, 1966, C 37,863
Int. Cl. G03b 9/64
U.S. Cl. 95—53.3      10 Claims

ABSTRACT OF THE DISCLOSURE

A photographic shutter having separate aperture opening and closing members and an electrical circuit having an electromagnet to regulate the exposure time. Each member is spring biased to perform its function but held back by a latch. The closing member latch holds the closing member with the aid of the electromagnet and is spring biased to release the closing member as soon as the magnetic force is terminated. The loading force of this spring is brought about by movement of the opening member from the shutter closed position to the shutter opened position.

---

*Cross reference to related application*

The electrical circuit described in this application is described more fully in the copending application by Paul Fahlenberg and Rudolf Lang, Ser. No. 586,760, filed Oct. 14, 1966, which application is assigned to the same assignee as that of the present application.

*Background of the invention—Field of the invention*

This invention relates to a photographic shutter, and in particular it relates to a photographic shutter having an opening member driven by a spring biased means to open the aperture of the shutter, and a closing member which is independent of the opening member and which is driven by its own spring biased means, and in which the time period between the opening and closing of the shutter aperture is determined by an electromagnetic delay circuit having a means for releasing the closing member.

*Field of the invention—Description of the prior art*

In shutters of this type, the armature of the magnet must not only hold the closing member in its cocked position very tightly during the exposure period of the shutter, but it must also move as rapidly as possible after the control period has terminated and the electromagnet is released, to release the closing member at a specific and predetermined moment. In previous shutters of this type, in order to assure quick and precise release of the closing member, a strong spring was applied to the electromagnet urging the same to its release position. It follows, of course, that a strong magnetic force was required to offset the force of the strong spring during the time prior to the release of the closing member. It has been possible to obtain the desired quick release with the prior art devices. However, in accomplishing this result certain disadvantages were evident. First, owing to the strong opposing forces it was difficult to obtain the necessary precision. Moreover, the previous devices required the incurrence of an additional expense to provide the extra strong magnet to offset the strong releasing force of the spring acting on the closing member. A strong magnet requires in an inconvenient manner a large structure and a large built-in space within the shutter casing.

SUMMARY OF THE INVENTION

A purpose of the present invention is to guarantee the the exactitude of the operating movements of the armature of the electromagnet, the opening member and the closing member while using only a small spring effort and consequently an extremely small counteracting magnetic force.

This purpose is obtained, according to the present invention, by the fact that the armature of the holding magnet is urged by a force opposing the electromagnetic force to release the closing member by a retractile spring wherein this spring is movable from a rest position into a position to load the magnet only in response to movement of the opening member after the latter has been released to move from the shutter closed position into the shutter opened position. Thus, since the force opposing the electromagnetic force and acting to release the closing member acts only for a short period of time immediately preceding the release of the closing member, then the force opposing the magnetic force will be much smaller than if the spring biased releasing force opposed the magnetic force during the entire opening and closing operation of the shutter. It follows that the magnitude of the magnetic force may be substantially reduced.

According to one form of the present invention, for a shutter with a cylindrical shutter housing surrounding the shutter objective aperture, the arrangement is such that both the opening member and the closing member are in the form of spring biased sliders movable in a direction substantially perpendicular to the cylindrical shutter axis and approximately tangential to the shutter objective aperture. The members cooperate with a pin attached to a ring for moving the shutter blades to open and close the shutter aperture. The opening slider member is held in the cocked position by a mechanical trip and a double armed locking lever is used to retain the closing slider member in the cocked position. One arm of the locking lever constitutes a locking pawl to hold the closing member and another arm is linked to the armature of the holding magnet.

In accordance with a further advantageous feature of the invention one end of a retractile spring engages the armature and its other end engages a loading lever. The loading lever is pivoted, upon engagement with a projection on the opening member, to bring the retractile spring from its rest position into its loaded position to oppose the magnetic force. Advantageously the locking lever and the loading lever are mounted on the same support pin to pivot about the same axis. Moreover, the retractile spring is so arranged as to surround this support pin and bear on the one hand against a pin on the armature and on the other hand against a pin on the loading lever.

In accordance with a further feature of the invention a compact form of construction is achieved by the fact that the two driving members, the opening and closing slider members, are mounted one in front of the other, in the direction of the optical axis of the shutter aperture, and are mounted for longitudinal sliding movement on pins engageable in elongated slots in the slider members. A recess is provided in the longitudinal side of each slider member facing the shutter objective aperture, and the bounding edges of this recess coact with a driving pin mounted on the blade driving ring.

Advantageously the spring which drives the opening slider member is anchored at one of its ends to the opening slider member and at its other end to the closing slider member. The spring biasing the closing slider member has one end secured to the closing slider member and the other end secured to a pin in the shutter housing, this spring acting to urge the closing slider member to close the shutter aperture.

In pursuance of a further feature of the invention, to prevent undesirable rebound oscillations, it is useful to provide a double armed safety lever which is pivotally mounted in the shutter housing, one arm of this lever cooperating with a control projection on the closing slider member and the other arm being pivotable into and out of the path of travel of an abutment pin mounted on the blade driving ring.

*Brief description of the drawings*

Other objects and the attendant advantages of the present invention will become apparent from the detailed description to follow together with the accompanying drawings which illustrate a preferred embodiment of the invention. However, it is to be understood that the detailed description and the drawings are intended merely for purposes of illustration and are not intended to limit the scope of the invention as set forth in the appended claims.

In the drawings:

FIGURE 1 is an elevational view of the shutter device with the front plate removed.

FIGURE 2 illustrates a cross section of the shutter shown in FIGURE 1 and taken along line II—II of FIGURE 1.

FIGURES 3, 4 and 5 are partial elevation views of the shutter of FIGURE 1 showing the elements at various stages in the operation of the shutter.

FIGURE 6 is a diagram of the electrical circuit employed with the present invention.

*Description of the preferred embodiment*

In describing the structure and operation of the invention the words describing direction (clockwise, counter clockwise, right, left, forward, rearward, etc.) are used for convenience with reference to the accompanying drawings. It is to be understood that these words are not to be construed as limiting in the absolute sense as the invention can, of course, assume any orientation in practice.

An annular shutter housing 10 carries, at the front side, a front plate 12 and a time setting ring 14 which is coupled for rotary movement with a time control ring 14a. An annular plate 16 is coupled to the rear of the shutter housing 10 so as to leave a hollow annular space between the parts 10 and 16 to receive shutter blades 18. For simplicity only one blade has been shown in the drawings. However in a typical shutter there may be five such blades. Each shutter blade 18 has a control slot 18a which receives and cooperates with a fixed mounting pin 20 of the annular plate 16, and an opening 18b which accommodates a control pin 22a fixed to a blade driving ring 22 which in turn is rotatably mounted in an annular space 10a in the shutter housing 10. The shutter aperture is opened by rotating the ring 22 counterclockwise to swing the blades 18 clockwise about fixed pivot pins 20. Conversely, the aperture is closed by blades 18 when the ring 22 is moved in the opposite direction.

Secured to the blade driving ring 22 is a driving pin 22b which extends forwardly through an opening 10b in the shutter housing 10 parallel to the optical axis of the shutter aperture. This pin cooperates alternately with two driving slider members 24 and 26. The slider members are disposed tangential to the objective aperture and are guided by two pins 28 and 30 which extend parallel to the optical axis of the shutter aperture and are fastened in the shutter housing 10. The two slider members have elongated slots cooperating with the guide pins. In addition the longitudinal sides of the slider members facing the objective aperture are formed with recesses to allow for the passage of the driving pin 22b. The recess in the slider member 24 is bounded by edges 24a and 24b, the same being true of the edges 26a and 26b in the case of the slider member 26. Each slider member is biased by its own individual driving spring. The driving spring 32 of the slider member 24 is hooked to the pin 24c on the slider member 24 and to a pin 26c on the slider member 26. The driving spring 34 for the slider member 26 is anchored to the pin 26d on the slider member 26 and to a stationary pin 36. An arm 26e on the slider member 26 projects from the shutter housing 10 to allow for loading of the driving springs 32, 34, this arm being movable to move the slider member 26 to the right to load the springs.

The movement of slider 24 to the right by spring 32, relative to slider 26, is limited by a forwardly projecting edge 26f on slider 26. (Compare the relative position of sliders 24 and 26 in FIGURE 1 with the relative positions of these members in FIGURES 3–5.)

A pin 36, stationarily mounted in the shutter 10, limits leftward movement of slider 26 under the influence of spring 34. A trip lever 38 is mounted at 40 in the shutter housing 10, and in the cocked condition a locking pawl 38a thereof engages behind a locking nose 24d on the slider 24 under the action of a return spring 42. A further double armed locking lever 44 is mounted in the shutter housing 10 on the pin 46 and, in the cocked condition, the locking pawl 44a thereof engages behind a locking nose 26g of the slider 26. An armature 50 of an electromagnet M is linked to the other arm of the locking lever 44 through the agency of a pin 48, and the two windings and associated iron cores of this electromagnet are fastened in the shutter housing 10 through an insulating piece 52. A weak spring 54 arranged around the pin 46 bears at one end against a fixed pin 56 and at the other end against the pin 48. This spring biases the locking lever 44 in the counterclockwise direction and the armature 50 against the magnetic cores.

A double armed pre-loading lever 58 is loosely mounted on the pin 46 forward of the locking lever 44. One arm 58a of lever 58 is disposed in the plane of the slider 24 and cooperates with the edge 24e of the latter. The other arm 58b is applied by a pre-loading retractile spring 60 against the pin 48 in the rest position. In this situation the pre-loading retractile spring 60 is wound around the mounting pin 46 and bears at one end against the pin 48 and at the other against a pin 58c of the lever 58.

A double armed safety lever 62 is pivotally mounted on the pin 40 behind the trip lever 38 and is biased in the clockwise direction by a torsion spring 64. The arm 62a of lever 62 cooperates with a cam formation 26h on the slider 26, while its other arm 62b is adapted to be moved into and out of the path of travel of a pin 22c on the blade driving ring 22, this pin 22c projecting forward through a slot 10c in the shutter housing 10.

The shutter is equipped with an electronic regulating arrangement for determining the exposure period. This arrangement, which is equipped with a battery and an RC-member, operates on the principle that, after the trip has been manually operated to release the slider 24, when blades 18 move to open the shutter aperture, the slider 26 is held by the locking lever 44 and the magnetic armature 50 until the electronic regulating arrangement de-energizes the electromagnet M after expiration of the present delay determining the exposure period.

The wiring diagram of the regulating arrangement is illustrated in FIGURE 6. Current is supplied from a battery B which charges the time-determining condenser C through an adjustable electrical resistant Rx and a restrictor resistance R1. The connections include a Schmitt trigger with transistors T1 and T2, a protective resistance R2, a collector resistance R3 and the magnetic windings of the electromagnet M referred to above. A setting potentiometer for adjusting the electronic regulating arrangement is denoted R4. Also associated with the circuit, as shown in FIGURES 1, 3 and 5, is a switch S movable from position I into position II under the influence of the pin 22c on the blade ring 22.

A time setting ring, which is adjustable in relation to an exposure time scale 10d at the periphery of the shutter, or the ring 14a which is coupled to this setting ring, carries the slider F associated with the resistance Rx.

The electrical elements and their connections, and the battery, may be installed in the shutter housing. The circuits can, for example, be provided on a plate-like circuit board of insulating material secured in the housing 10.

The shutter described operates as follows:

Assume that the shutter driving means is loaded by the slider 26 and the electronic arrangement is set by the slider F coupled to the setter 14 to a specific resistance Rx. The shutter then has the cocked position depicted in FIGURE 1. The two driving springs 32, 34 are fully loaded and the opening slider member 24 is held in the cocked position by the trip 38. The closing slider member 26 is held in the cocked position by the locking lever 44, the locking pawl 44a of this lever engaging behind the nose 26g of the closing slider 26 under the action of spring 54. Since, however, the switch S is in position I when the shutter is in this rest and cocked condition, the battery B is disconnected from the electronic arrangement and consequently, the magnet M is also deenergized.

If now the trip 38 is moved in the counter clockwise direction, the opening slider 24 becomes free from pawl 38a and begins to move towards the right under the action of its driving spring 32, the edge 24a thereof carrying the pin 22b to the right and shifting the blade driving ring 22 counter clockwise into the position illustrated in FIGURE 3. Thus the blades 18 completely uncover the objective aperture. The maximum movement of pin 22b to the right is determined by abutment of pin 22b against the righthand limit edge of slot 10b in shutter housing 10.

Right at the beginning of the opening movement of the blade driving ring 22, the pin 22c thereof releases the resilient spring switch S, allowing it to move from position I to position II. This connects the battery B to the electronic regulating arrangement. At the moment the switching takes place, the transistor T1 fully blocks, so that the base of transistor T2 is applied to the battery B through resistance R3. The collector current flowing through transistor T2 energizes the two coils of the holding magnet M so that the armature 50 thereof is held under the full power of the magnet M. This holding function of the magnet M starts a brief period after the moment the switching has taken place.

Towards the ends of the rightward movement of the opening slider 24, the edge 24e on slider 24 abuts the arm 58a of the loading lever 58, as a result of which the loading lever 58 pivots a specific amount in the clockwise direction thereby loading the retractile spring 60 from its almost completely relaxed rest position (FIGURE 1) into a corresponding pre-tensioned position (FIGURE 3). The force of this spring 60, when loaded, must not exceed the opposing force of the now energized retaining magnet. Since there is a small clearance between the pin 22b and the edge 26a of the closing slider 26 when the blades are open, any rebound oscillations which might perhaps tend to develop, when the righthand position of the opening slider 24 is reached, cannot have any effect on the fastening at 26g, 44a. Moreover, this fastening remains completely unaffected by the opening movements of the parts 22 and 24.

When the switch S is moved from I to II a charging current begins at the same time to flow into condenser C through the regulating resistance Rx, which has been set by hand, and this current flow continues until the base of transistor T1 exceeds its emitter voltage. The trigger swings over at this moment so that the transistor T1 then becomes conductive, while the transistor T2 completely blocks.

As soon as the current flow through transistor T2 ceases, the magnet M also becomes deenergized and its armature 50 drops away rapidly under the action of the fully tensioned retractile spring 60, and as a result the locking lever 44 can release the closing slider 26 at 44a, after a precisely defined time period. The closing slider 26 now moves to the right under the action of its spring 34 with its edge 26a carrying the pin 22b of the blade driving ring 22, and its edge 26f carrying the opening slider 24. The ring 22 now moves clockwise and blades 18 close the objective aperture and the photograph is taken with an exposure period corresponding to the delay interval of the electronic regulating arrangement determined by the adjustable resistance Rx.

Immediately after the photograph has been taken, the shutter elements assume the rest position shown in FIGURE 5. The closing slider 26, in its leftmost position, bears against the stationary abutment pin 36 while the opening slider 24 is drawn to the right, relative to slides 26, against the abutment surface 26f on the slider 26 under the action of its spring 32. The catch 38, 38a then turns clockwise to engage nose 24d on slider 24. The pin 22c of the blade driving ring, having been returned to its clockwise position, has engaged switch S, moving it from II to I, causing the current supply to the emitter conduit of the two transistors T1, T2 to be interrupted and the condenser to be charged through the resistance R1.

As soon as the closing slider 26 has reached the position in which it abuts the pin 36, the cam piece 26h thereof allows the safety lever 62 to pivot in the clockwise direction under the effect of its spring 64 so that the arm 62b thereof is brought in front of the pin 22c of the blade driving ring 22. This inhibits any rebound oscillations which might tend to arise when the sliders 24, 26 reach the rest position and the driving pin 22b abuts the lefthand bounding edge of the opening 10b in the shutter housing 10.

Finally, to return the elements of the shutter to the cocked position illustrated in FIGURE 1, the lever 26e is moved to the right thereby moving slider 26 to the right, loading springs 32 and 34, until the nose 26g on slider 26 latches behind pawl 44a. During this rightward movement of slider 26, the slider 24 is held in its leftward position by pawl 38a which had become engaged with nose 24d of slider 24 during the aperture closing movement of sliders 24 and 26.

As can be seen from the preceding description, the shutter drive has the advantage that the retractile spring 60 exerts its minimum power (relaxed power) on the armature 50 in the rest position (FIGURE 5) and the cocked position (FIGURE 1) of the shutter, so that the armature 50 can be held to the holding magnet M in these positions with only a small effort, namely by the weak spring 54. The retractile spring 60 only develops its full force when the opening slider 24 is moving from the rest position to the blade opened position (to the right) and the electromagnet M is already energized. This enables use to be made of a less powerful holding magnet, and this is of particular advantage as regards the space demanded. The two driving sliders and their associated springs and locking means also form a constructional unit which only requires a modest space within the shutter even in the case of the most powerful driving springs required to afford minimum exposure periods. Thus these driving means can be used without any difficulty even in the case of shutters of very small dimensions.

The invention has been described and shown in considerable detail with respect to a preferred embodiment thereof. However, it is to be understood that the invention is capable of numerous modifications and variations without departing from the spirit or scope of the invention as defined in the appended claims.

I claim:
1. In a photographic shutter device of the type having a blade means for selectively opening or closing an objective aperture, an opening member operative by spring biased means to move the blades to open the aperture, a closing member separate from the opening member and operative by spring biased means to move the blades to close the aperture, and an electrical circuit for controlling the exposure period during which the aperture remains open, the improvement comprising a first lever means mounted in said shutter and movable between a first position for holding the closing member in its non-operative position, and a second position for releasing the closing member so that it can be moved by its spring biased means to close the aperture, and electromagnetic means provided with an armature movable from a rest position to an operative position, whereby a magnetic force derived from the electrical circuit holds the armature in said operative position, coupling means on said armature for connection thereof with said first lever means, and said armature of the electromagnetic means being movable to the operative position against a retractile spring, said retractile spring opposing the magnetic force and moving said first lever means for releasing the spring biased closing member when the magnetic force is removed, and a second lever means mounted in said shutter and movable upon engagement with said opening member, when the latter is moved for opening the aperture, for loading the retractile spring.

2. In a photographic shutter device as claimed in claim 1, the shutter including a cylindrical housing surrounding the objective aperture, said blade means including a plurality of blades operatively connected to a ring member in the housing and surrounding the aperture, whereby movement of the ring in a first direction causes the blade to open the aperture and movement of the ring in a second direction causes the blades to close the aperture, and a driving pin member connected to said ring and selectively engaged by said opening member for movement in the first direction to open the aperture and by said closing member for movement in the second direction to close the aperture, and each of said opening and closing members being mounted in the housing for sliding movement in a direction substantially perpendicular to the axis of the cylindrical housing to perform their opening and closing movements.

3. A photographic shutter as claimed in claim 2 including a trip member mounted in the shutter for holding the opening member in its non-operative position, an exterior portion of said trip member extending to the outside of the shutter housing and movable to release the opening member so that it can be moved by its spring biased means to open the aperture, and said first lever being a pivotally mounted double arm lever, one arm including a pawl for holding the closing member in the non-operative position and the other arm connected to the armature of said electromagnetic means.

4. A photographic shutter device as claimed in claim 3 wherein one end of the retractile spring engages the armature of electromagnetic means and the other end engages the second lever means, said second lever means being a pivotally mounted double arm lever, wherein when one arm is engaged by the opening member the other arm moves the retractile spring from its rest position to its loaded position.

5. A photographic shutter device as claimed in claim 4 wherein the said first and second levers are mounted for pivotal movement about the same axis.

6. A photographic shutter device as claimed in claim 5 wherein the rectractile spring surrounds the said same pivotal axis and bears at one of its ends against a pin on the armature of electromagnetic means and at its other end against a pin on the second lever.

7. A photographic shutter device as claimed in claim 2 wherein the opening and closing members are arranged one in front of the other in the direction of the cylindrical housing axis, each member being mounted on a fixed guide pin which engages in an elongated slot in its respective member for longitudinal sliding movement of the member, each member having a recess in its longitudinal side facing the objective aperture, and each recess having a bounding edge arranged to coact with said driving pin mounted on the said ring.

8. A photographic shutter device as claimed in claim 7 wherein the spring biased means of the opening member includes a spring element anchored at one end to the opening member and anchored at the other end to the closing member, and the spring biased means of the closing member including a spring element mounted to urge the closing member to the aperture closing position and secured at one end to the closing member and secured at its other end to a pin which is fixedly mounted in the shutter housing.

9. A photographic shutter device as claimed in claim 2 including a double arm safety lever pivotally mounted in said shutter, an abutment pin on said ring and movable therewith, said safety lever being movable to a first position to prevent movement of the abutment pin on the ring to open the aperture when the closing member is in the fully released position, and wherein said safety lever is moved by said closing member to a second position to permit movement of the abutment pin and ring to open the aperture when the closing member is held in the non-operative position by the said first lever.

10. In a photographic shutter device of the type having blades adapted to be opened by an opening member and closed by a closing member which is independent of the opening member, first spring means for driving said opening member from a blades closed position to blades opened position, second spring means for driving said closing member from a blades opened position to a blades closed position, and an electronic delay device for determining the time period between the opening and closing movements of the blades, said electronic delay device having a holding magnet equipped with an armature adapted to operate means for latching the closing member, the improvement comprising a retractile spring engaging said armature and opposing the electromagnetic force, acting on said armature, and means on said opening member for moving said retractile spring from a rest position into a loaded position during the rundown movement of the opening member from the blades closed position to the blades opened position.

References Cited

UNITED STATES PATENTS

| | | | |
|---|---|---|---|
| 2,971,446 | 2/1961 | Noack | 95—64 XR |
| 3,095,795 | 7/1963 | Yates | 95—36 XR |
| 3,348,460 | 10/1967 | Schmitt | 95—53 XR |

NORTON ANSHER, *Primary Examiner.*

L. H. McCORMICK, JR., *Assistant Examiner.*

U.S. Cl. X.R
95—36, 53